US007102299B2

(12) United States Patent
Jones et al.

(10) Patent No.: US 7,102,299 B2
(45) Date of Patent: Sep. 5, 2006

(54) ELECTRONIC CIRCUITS

(75) Inventors: Philip Matthew Jones, Cambridge (GB); Christopher James Newton Fryer, Cottenham (GB)

(73) Assignee: Pelikon Limited, Caerphilly (GB)

(*) Notice: Subject to any disclaimer, the term of this patent is extended or adjusted under 35 U.S.C. 154(b) by 0 days.

(21) Appl. No.: 10/468,697

(22) PCT Filed: Feb. 26, 2002

(86) PCT No.: PCT/GB02/00859

§ 371 (c)(1),
(2), (4) Date: Apr. 7, 2004

(87) PCT Pub. No.: WO02/069675

PCT Pub. Date: Sep. 6, 2002

(65) Prior Publication Data

US 2004/0178747 A1 Sep. 16, 2004

(30) Foreign Application Priority Data

Feb. 26, 2001 (GB) ................... 0104717.4

(51) Int. Cl.
G05F 1/00 (2006.01)
H05B 37/02 (2006.01)
H05B 39/04 (2006.01)
H05B 41/36 (2006.01)

(52) U.S. Cl. ..................... 315/291; 315/209

(58) Field of Classification Search ............... 315/291, 315/209
See application file for complete search history.

(56) References Cited

U.S. PATENT DOCUMENTS 4,736,151 A * 4/1988 Dishner .................. 323/224

(Continued)

FOREIGN PATENT DOCUMENTS

EP 0 699 015 A1 7/1995

(Continued)

OTHER PUBLICATIONS

Caricchi, F. et al.; Title "Study Of Bi-Directional Buck-Boost Converter Topologies For Application In Electrical Vehicle Motor Drives"; Applied Power Electronics conference and Exposition, 1998; Conference Proceedings 1998. Thirteenth Annual Anaheim, CA., USA Feb. 15-19, 1998, New York, NY, USA, IEEE, US, Feb. 15, 1998, pp. 287-293, XP010263608; ISBN: 0-780304340-9; paragraph '000I!; Figure 2.

*Primary Examiner*—Don Wong
*Assistant Examiner*—Marie Antoinette Cabucos
(74) *Attorney, Agent, or Firm*—Sutherland Asbill & Brennan LLP

(57) ABSTRACT

An electronic circuit for providing a high voltage alternating current supply from a DC supply to an electroluminescent lamp. The circuit includes an inductive element and an output switching element arranged in series. The output switching element is operable to alternate, in use, between a first state and a second state, whereby in the first state a current path is provided through the inductive element and the output switching element, which current path is interrupted in the second state, such that when the output switching element changes from the first state to the second state, the inductive element generates a voltage at an output of the circuit for charging the electroluminescent lamp. The circuit includes an output diode arranged to prevent current flowing back from the output while the output switching element is in the first state.

14 Claims, 6 Drawing Sheets

U.S. PATENT DOCUMENTS

| | | | |
|---|---|---|---|
| 5,559,402 A | 9/1996 | Corrigan, III | 315/169.3 |
| 5,594,629 A * | 1/1997 | Steigerwald | 363/21.14 |
| 5,770,923 A | 6/1998 | Beard | 315/169.3 |
| 6,008,589 A * | 12/1999 | Deng et al. | 315/209 R |
| 6,069,804 A | 5/2000 | Ingman et al. | 363/21 |
| 6,078,149 A * | 6/2000 | Preis et al. | 315/307 |
| 6,175,191 B1 * | 1/2001 | Yamazaki | 315/169.3 |
| 6,320,323 B1 * | 11/2001 | Buell et al. | 315/169.3 |
| 6,392,364 B1 * | 5/2002 | Yamamoto et al. | 315/291 |

FOREIGN PATENT DOCUMENTS

EP 0 971 565 A1 6/1999

* cited by examiner

ELECTRONIC CIRCUITS

This application is a 371 of PCT GB02/00859 filed Feb. 26, 2002.

TECHNICAL FIELD

The present invention relates to electronic circuits, and in particular to electronic circuits which can be used in a high voltage power supply for a capacitive load, such as an electroluminescent lamp.

BACKGROUND OF THE INVENTION

Electroluminescent lamps generally comprise a layer of phosphor material, such as a doped zinc sulphide powder, between two electrodes. It is usual for at least one electrode to be composed of a transparent material, such as indium tin oxide (ITO), provided on a transparent substrate, such as a polyester or polyethylene terephthalate (PET) film. The lamp may be formed by depositing electrode layers and phosphor layers onto the substrate, for example by screen printing, in which case opaque electrodes may be formed from conductive, for example silver-loaded, inks. Examples of electroluminescent devices are described in WO 00/72638 and WO 99/55121.

An electroluminescent lamp of the general type described above is illuminated by applying an alternating voltage of an appropriate frequency between the electrodes of the lamp to excite the phosphor. Commonly, the phosphors used in electroluminescent lamps require a voltage of a few hundred volts. Typically, such electroluminescent lamps may have a capacitance in the range 100 pF to 1 µF.

The inventors have been involved in the development of electroluminescent displays which comprise electroluminescent lamps having selectively illuminable regions for displaying information. Such displays have the advantage that they can be large, flexible and relatively inexpensive. In the context of such electroluminescent displays, the inventors have sought to provide a simple power supply arrangement for an electroluminescent lamp or display.

A known type of circuit for producing a higher output voltage from a low voltage DC supply is a "flyback converter". Such a circuit comprises an inductor and an oscillating switch arranged in series. In parallel with the oscillating switch, a diode and a capacitor are arranged in series. The switch oscillates between an open state and a closed state. In the closed state, a current flows from the DC supply through the inductor and the switch. When the switch is opened, the current path is interrupted, but the magnetic field associated with the inductor forces the current to keep flowing. The inductor therefore forces the current to flow through the diode to charge the capacitor. The diode prevents the capacitor discharging while the switch is closed. The capacitor can therefore be charged to a voltage which is higher than the DC supply voltage, and current at this voltage can be drawn from the capacitor.

In order to supply an alternating current to a load from a flyback converter, an H-bridge may be provided in parallel with the capacitor. In general, an H-bridge comprises two parallel limbs, each limb having a first switch in series with a second switch. On each limb between the first and second switches there is a node, and the load is connected between the respective nodes of the limbs. Current can flow through the load in one direction via the first switch of one limb and the second switch of the other limb and in the other direction via the other two switches. The switches of the H-bridge are operated so that current flows through the load first in one direction and then in the other.

When an H-bridge is used to supply a capacitive load $C_L$ with a supply voltage V, during the first half of the cycle of operation, the load $C_L$ is at +V. When the H-bridge switches and reverses the polarity of the load, there is a potential difference of −2V between the supply voltage and the load. The load is supplied rapidly with current from the supply until there is no potential difference, and this requires $2C_LV^2$ of energy. Similarly, when the H-bridge is switched to return the load to the original polarity at the end of the cycle, a further $2C_LV^2$ of energy is required to bring the load back to +V.

It will be seen, therefore, that each cycle of the operation of the H-bridge requires $4C_LV^2$ of energy. The power consumption, assuming 100% efficiency, is $4C_LV^2f$, where f is the cycling frequency of the H-bridge. This represents a significant power consumption when the frequency and the voltage are large.

It is usual to provide a large smoothing capacitor (such as the capacitor of the flyback converter described above) in parallel with the H-bridge in order to provide current for the rapid charging and discharging of the capacitive load. The smoothing capacitor protects the power supply from the large currents which result from the switching of the polarity of the H-bridge, and ensures that the supply voltage does not drop significantly.

When the polarity of the H-bridge is switched, energy is consumed in recharging the capacitive load. The inventors have sought to reduce this energy consumption.

SUMMARY OF THE INVENTION

The present invention provides an electronic circuit for providing a high voltage supply to a capacitive load, such as an electroluminescent lamp, wherein:

the circuit comprises an inductive element and an output switching element arranged in series;

the output switching element is operable to alternate, in use, between a first state and a second state, whereby in the first state a current path is provided through the inductive element and the output switching element, which current path is interrupted in the second state, such that when the output switching element changes from the first state to the second state, the inductive element generates a voltage at an output of the circuit for charging a capacitive load;

the circuit comprises an output diode arranged to prevent current flowing back from the output while the output switching element is in the first state;

the circuit further comprises a reservoir capacitor, a reservoir switching element in series with the inductive element, and a reservoir diode;

the reservoir switching element is operable to alternate between a first state and a second state, whereby in the first state a current path is provided from the capacitive load through the inductive element and the reservoir switching element, which current path is interrupted in the second state, such that when the reservoir switching element changes from the first state to the second state the inductive element generates a voltage to charge the reservoir capacitor; and the reservoir diode is arranged to prevent current flowing back from the reservoir capacitor while the reservoir switching element is in the first state, whereby energy can be transferred from the capacitive load to the reservoir capacitor by means of the inductive element and the reservoir switching element, and energy can be transferred from the reservoir capacitor to the capacitive load by means of the inductive element and the output switching element.

Thus, in accordance with the invention, energy stored in the charged capacitive load can be recovered and stored in the reservoir capacitor, so that the overall energy consumption of the circuit is reduced compared to known flyback converter arrangements.

The reservoir capacitor may have any suitable capacitance. However, preferably, the reservoir capacitor has a capacitance which is greater than that of the capacitive load. This has the advantage that the energy stored in the capacitive load can be transferred to the reservoir capacitor and stored at a much lower voltage, which reduces the power loss in charging the reservoir capacitor. The reservoir capacitor may be at least 10 times or preferably at least 100 times the capacitance of the capacitive load.

The inductive element may be any suitable component which is capable of operating in the required manner. Typically, the inductive element may have an inductance in the range 50 µH to 50 mH, for example 470 µH.

In a simple embodiment, the inductive element may be an inductor or coil. In a preferred arrangement, however, the inductive element is a transformer. The provision of a transformer has the advantage that the transfer of energy between the part of the circuit which includes the reservoir capacitor and the part of the circuit which includes the capacitive load can be achieved by the interaction of the magnetic fields of the two sides of the transformer. In this way, direct current flow from the capacitive load to the reservoir capacitor and vice versa is not possible which means that the circuit can be implemented without a switching arrangement to regulate such current flow.

The transformer may have substantially identical primary and secondary windings. However, advantageously, the secondary winding which is electrically connected to the capacitive load has more turns than the primary winding. In this way, the transformer acts to step up the voltage which is transferred from the reservoir capacitor to the capacitive load and to step down the voltage which is transferred from the capacitive load to the reservoir capacitor. The ratio of turns of the primary to secondary winding may be in the range 1 to 100 and is generally greater than 10.

The output switching element may be arranged in series with one winding of the transformer and the reservoir switching element may be arranged in series with the other winding of the transformer.

The output diode may be any suitable device which allows current flow in one direction only over the range of operating voltages of the circuit and the term "diode" is used herein accordingly. The role of the output diode is to allow a higher voltage than the DC supply voltage to be stored on the capacitive load without current flowing back from the capacitive load towards the inductive element. The reservoir diode may be any suitable device which allows current flow in one direction only over the range of operating voltages of the circuit. The role of the reservoir diode is to allow a higher voltage than the DC supply voltage to be stored on the reservoir capacitor without current flowing back from the reservoir capacitor towards the inductive element.

The output and reservoir switching elements may be any suitable switching devices and, in general, are transistors. In the preferred arrangement, the switching elements are field effect transistors (FETs).

In a particularly preferred arrangement, the output and reservoir switching elements are n-channel FETs.

In a particularly advantageous arrangement, the output diode may be arranged in parallel with the reservoir switching element. In particular, the output diode and the reservoir switching element may be in the form of a single field effect transistor. In this case, the output diode is provided by the parasitic diode which is inherent in the construction of a field effect transistor.

Similarly, the reservoir diode may be arranged in parallel with the output switching element. In particular, the reservoir diode and the output switching element may be in the form of a single field effect transistor. In this case, the reservoir diode is provided by the parasitic diode which is inherent in the construction of a field effect transistor.

Advantageously, the output switching element and/or the reservoir switching element may be connected directly to earth potential. According to this arrangement, the switching elements are not required to be able to switch at high voltage, which simplifies the design of the circuit.

The operation of the output and/or reservoir switching elements may be controlled by any suitable means. In a preferred arrangement, a control voltage is applied to the respective switching element, for example to the gate of the FET. The control voltage may be a pulse width modulated signal. Typically, the frequency of the control voltage is in the range of 10 to 100 kHz. The circuit may further comprise an oscillator arranged to generate the control voltage.

The circuit according to the present invention may be used to directly supply a capacitive load with a varying voltage. However, in a preferred arrangement, the circuit is provided with an H-bridge in order to supply alternating current to the capacitive load.

Thus, the circuit may comprise an H-bridge having two parallel limbs, each limb having a first switching element in series with a second switching element and a node between the first and second switching elements, the capacitive load being connected, in use, between the respective nodes of the limbs. The switching elements of the H-bridge may be controlled alternately such that in a first condition the first switching elements of one limb and the second switching elements of the other limb conduct to supply current from the output to the capacitive load in one direction, and in a second condition the other two switching elements of the limbs conduct to supply current from the output to the capacitive load in the opposite direction.

A smoothing capacitor may be provided in parallel with the H-bridge in order to compensate for the imperfect switching of the switching elements of the H-bridge. However, the capacitance of the switching capacitor is desirably kept small, for example less than 50% of the capacitance of the capacitive load, preferably between 10% and 20% of the capacitance of the capacitive load.

The switching elements of the H-bridge may be any suitable switching devices and, in general, are transistors. In the preferred arrangement, the switching elements are field effect transistors (FETs). In a particularly preferred arrangement, the first switching elements are p-channel FETs and the second switching elements are n-channel FETs.

The operation of the switching elements of the H-bridge may be controlled by any suitable means. In a preferred arrangement, a polarity voltage is applied to the switching elements, for example to the gates of the FETs. The polarity voltage may be a pulse width modulated signal. Thus, the circuit may further comprise an oscillator arranged to generate the polarity voltage. In a particularly convenient arrangement, the signal from the oscillator may also be used to generate the control voltage for the reservoir switching element and/or the output switching element in order to provide synchronised operation of the converter and the H-bridge, optionally by means of a divider. Typically, the frequency of the polarity voltage is in the range 50 Hz to 10 kHz.

The circuit according to the invention is particularly useful when used in combination with an H-bridge arrangement, because the polarity of the H-bridge can be switched while energy from the capacitive load is stored in the reservoir capacitor. In this way, the H-bridge can be switched while there is little or no voltage across the capacitive load which reduces energy losses and significantly simplifies the design of the circuit.

The circuit may be arranged to operate in accordance with the following steps:

a) the H-bridge is switched to the first condition;
b) energy from the reservoir capacitor is transferred to the capacitive load by means of the inductive element and the output switching element;
c) energy from the capacitive load is transferred to the reservoir capacitor by means of the inductive element and the reservoir switching element;
d) the H-bridge is switched to the second condition;
e) energy from the reservoir capacitor is transferred to the capacitive load by means of the inductive element and the output switching element;
f) energy from the capacitive load is transferred to the reservoir capacitor by means of the inductive element and the reservoir switching element.

The steps a) to f) may be repeated to drive the capacitive load with an alternating voltage.

Current may be supplied to the reservoir and/or the capacitive load from a DC supply to compensate energy losses in the circuit. In particular, the capacitive load may initially be charged from the DC supply by means of the inductive element and the output switching element.

Typically, the DC supply has a voltage of less than 100 V, for example in the range 2 to 24 V. The capacitive load may be charged to a peak voltage between 5 to 500 times that of the supply voltage. Typically, the peak voltage is in the range 10 to 100 times that of the supply voltage.

The output switching element may be arranged to alternate between the first and the second state at the same frequency as the reservoir switching element. However, the output switching element may be arranged to alternate between the first state and the second state at a frequency which is different to the frequency at which the reservoir switching element alternates between the first and the second state. The output switching element may be arranged to alternate between the first and the second state at a frequency which is a multiple of the frequency at which the H-bridge alternates between the first condition and the second condition. In this way, the switching signal to the switching elements of the converter and the H-bridge can be generated from the same oscillator, for example using a divider.

In the preferred arrangement, the capacitive load is an electroluminescent lamp.

These and other features of the present invention will become apparent upon review of the following detailed description of the invention when taken in conjunction with the drawings and appended claims.

BRIEF DESCRIPTION OF THE DRAWINGS

Some embodiments of the invention will now be described by way of example only and with reference to the accompanying drawings, in which.

DETAILED DESCRIPTION OF THE INVENTION

In the embodiments described, corresponding reference signs have been used to indicate corresponding components.

Figure 1A:
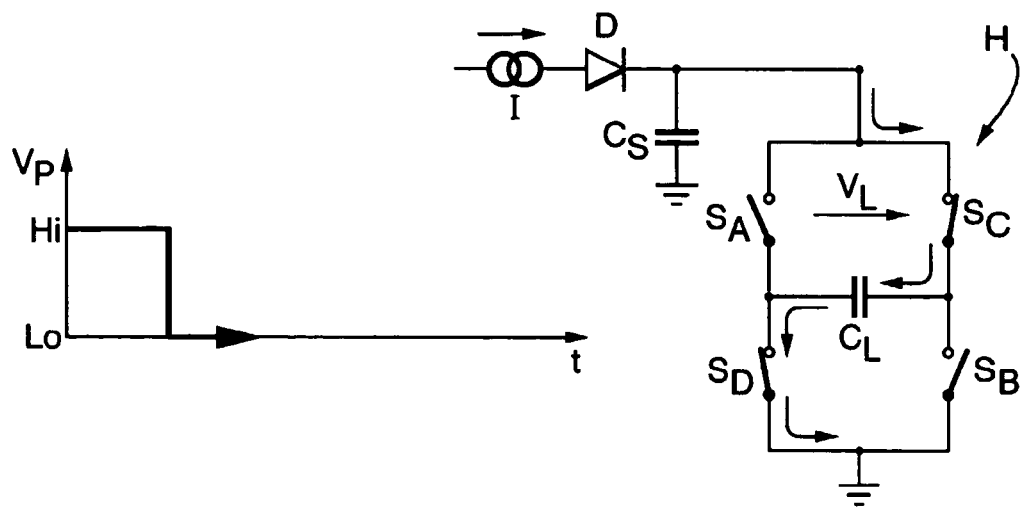
FIG. 1a and FIG. 1b represent the operation of an H-bridge for use with the invention.

Referring to FIG. 1a, there is shown an electronic circuit incorporating an H-bridge. The circuit comprises a current source I in series with a diode D and an H-bridge arrangement H. A smoothing capacitor $C_S$ is provided in parallel with the H-bridge arrangement H and is connected to earth potential.

The H-bridge arrangement H in FIG. 1a comprises four switch elements $S_A$ to $S_D$ which are represented as simple switches for reasons of clarity. In a practical circuit, the switches $S_A$ to $S_D$ are provided by field effect transistors (FETs). The H-bridge comprises two parallel limbs each having two switches $S_A$, $S_D$ and $S_C$, $S_B$ arranged in series. A capacitive load $C_L$ in the form of an electroluminescent lamp is connected between the limbs of the H-bridge at nodes on each limb which are between the switches of the limb. The H-bridge is connected to earth potential at one end.

Figure 1B:
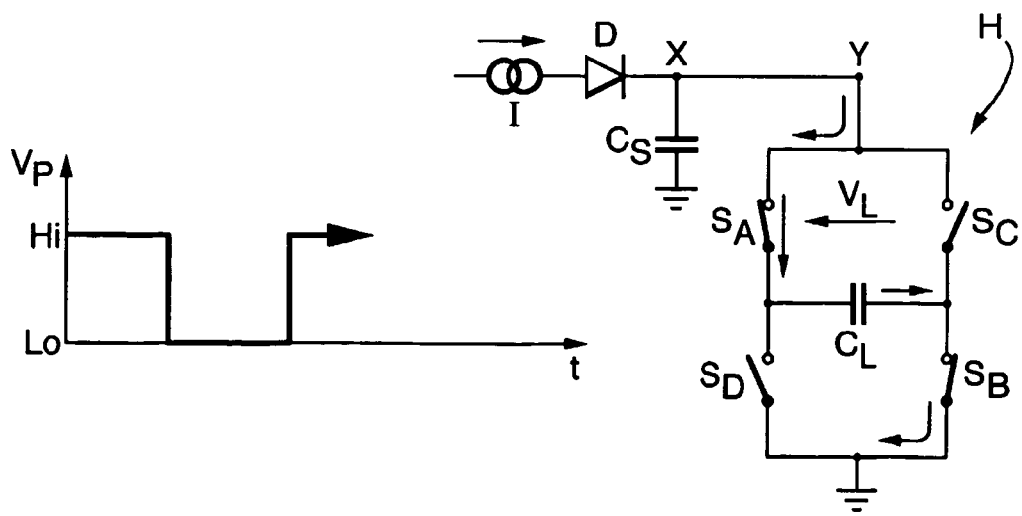

The positions of the switches $S_A$ to $S_D$ are controlled byte polarity voltage $V_P$, the variation of which over time is represented in FIGS. 1a and 1b. When $V_P$ is low, switches $S_A$ and $S_B$ are open and do not conduct and switches $S_C$ and $S_D$ are closed and conduct. This situation is shown in FIG. 1a. When $V_P$ is high, switches $S_A$ and $S_B$ are closed and conduct while switches $S_C$ and $S_D$ are open and do not conduct. This situation is illustrated in FIG. 1b.

The operation of the circuit shown in FIGS. 1a and 1b will now be described. A converter such as a flyback converter or forward converter, represented as a current source I, supplies current via the diode D to the smoothing capacitor $C_S$ and the capacitive load $C_L$. The direction in which the capacitive load $C_L$ is charged is determined by the position of the switches $S_A$ to $S_D$. The capacitors $C_S$ and $C_L$ continue to be charged until the current source I ceases to supply current. The voltage on the capacitors $C_S$ and $C_L$ consequently rises. Reverse current flow from the capacitors is prevented by the diode D.

Thus, when the capacitive load $C_L$ is fully charged to the load voltage $V_l$, the charge thereon is $C_L V_L$ and the charge on the smoothing capacitor is $C_S V_L$. When the polarity voltage $V_P$ goes high, as shown in FIG. 1b, the polarity of the charged capacitive load $C_L$ with respect to the smoothing capacitor $C_S$ and the current source is reversed. Thus, point Y in FIG. 1b is at a potential $-V_L$ relative to earth potential, while the potential at point X is $+V_L$ relative to earth potential. This potential difference causes current to flow until points X and Y are at the same potential.

Figure 2A:
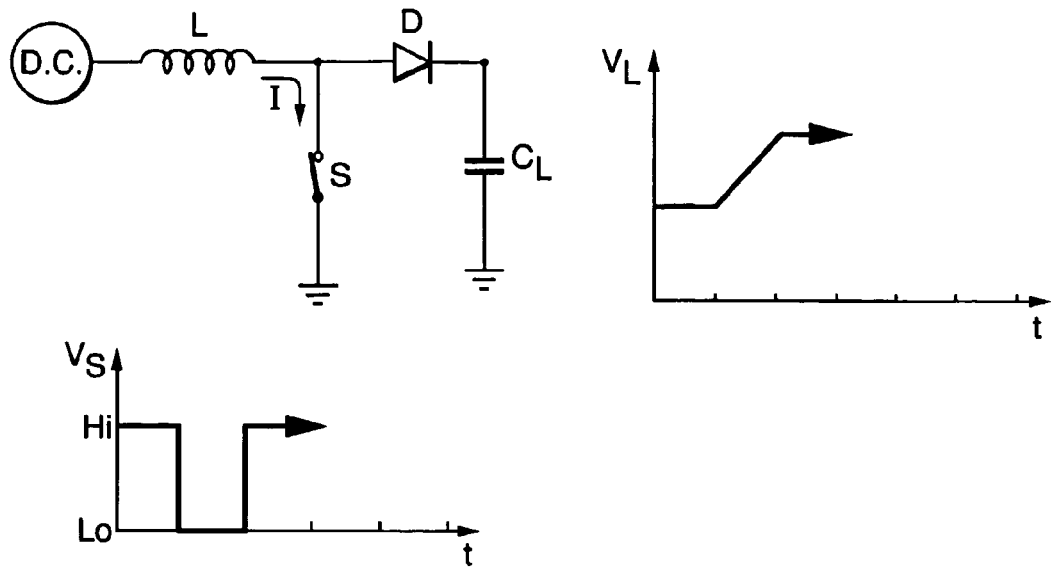
FIG. 2a and FIG. 2b illustrate the operation of a flyback converter.
Figure 2B:
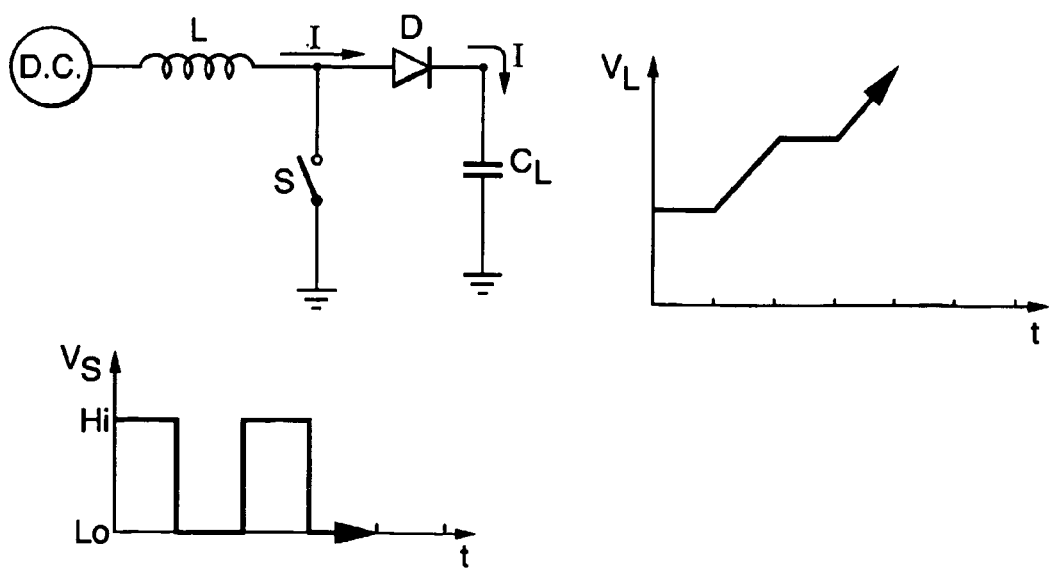

FIGS. 2a and 2b show an arrangement of a flyback converter for charging a capacitive load to a high voltage. The flyback converter shown in FIG. 2 can be used with the H-bridge arrangement H shown in FIG. 1, although for the sake of simplicity the capacitive load $C_L$ is shown in FIG. 2 without the H-bridge.

As shown in FIG. 2a, the flyback converter comprises a DC supply in series with an inductor L and a switch S. The switch S is connected between the inductor and earth potential. In a practical arrangement, the switch S is provided by a field effect transistor. However, for the sake of clarity, in FIGS. 2a and 2b the switch S is shown as a simple switch.

In parallel with the switch S is provided a diode D in series with the capacitive load $C_L$. The capacitive load $C_L$ is arranged between the diode and earth potential.

The switch S is controlled by a switch voltage $V_S$ which varies over time as indicated in FIG. 2a. When the switch voltage $V_S$ is high, the switch S is closed and conducts. This situation is shown in FIG. 2a. When the switch voltage $V_S$ is low, the switch S is open and does not conduct. This situation is shown in FIG. 2b.

The circuit shown in FIGS. 2a and 2b operates as follows. While the switch voltage $V_S$ is high, as shown in FIG. 2a, current I flows from the DC supply through the inductor L and the closed switch S to earth. Assuming the voltage on the capacitive load $C_L$ is higher than the DC supply voltage, no current flows through the diode D.

When the switch voltage $V_S$ goes low, as shown in FIG. 2b; the current path through the inductor L and switch S is interrupted by the open switch S. However, the energy stored in the magnetic field associated with the inductor L forces the current I to continue flowing and the inductor L generates a sufficiently high voltage that the current I flows through the diode D to charge the capacitive load $C_L$. In this way, with each transition of the switch voltage $V_S$ from high to low, the voltage $V_L$ on the capacitive load $C_L$ is increased, as indicated in FIG. 2b. The diode D prevents current flow back from the capacitive load $C_L$ to earth or to the DC supply when the switch S is closed.

It will be seen therefore that the capacitive load $C_L$ can be charged to any desired voltage by applying an alternating switch voltage $V_S$ to the switch S.

Figure 3A:
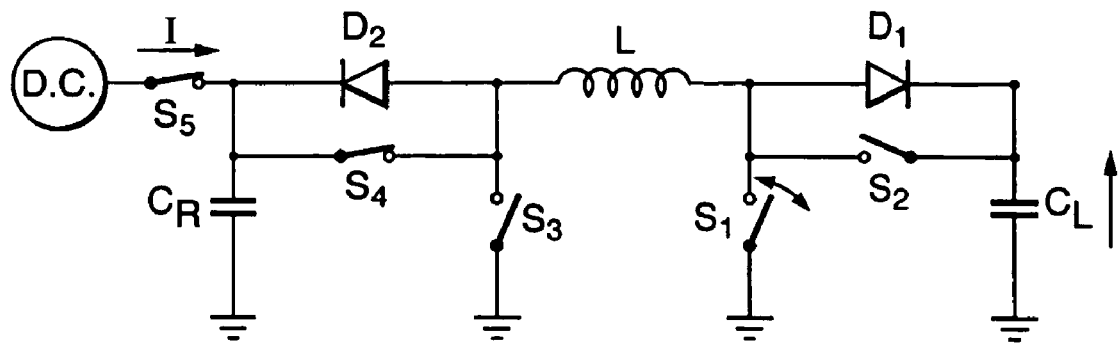
FIGS. 3a to 3c illustrate the operation of an embodiment of the invention.
Figure 3B:
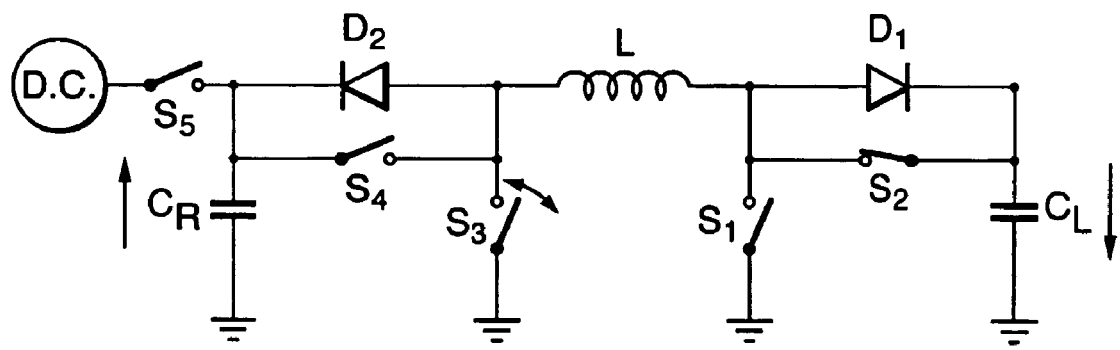
Figure 3C:
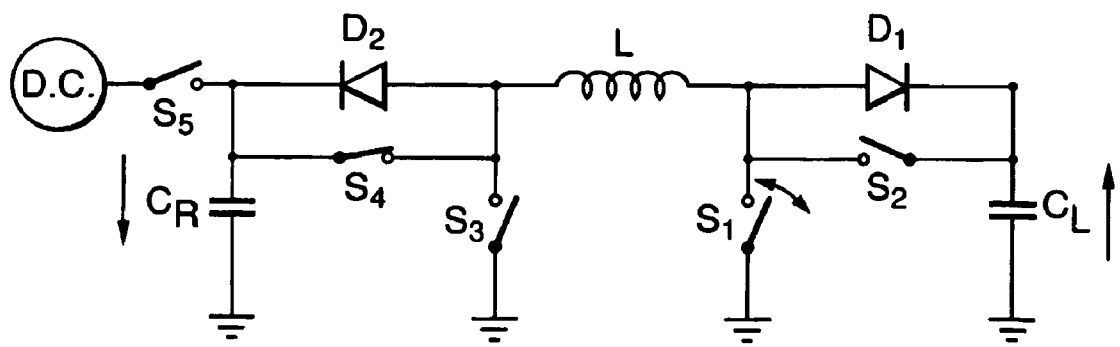

FIGS. 3a to 3c show an improved flyback converter according to the invention. Again, this configuration can be used with the H-bridge shown in FIG. 1, but for simplicity the circuit is shown directly connected to the capacitive load $C_L$. This arrangement is similar to that of FIG. 2 in that this arrangement comprises a DC supply in series with an inductor L. The inductor L is also in series with a switch $S_1$, connected between the inductor L and earth potential, which corresponds to the switch S in FIG. 2. In parallel with the switch $S_1$ are an output diode $D_1$, which corresponds to the diode D of FIG. 2, and the capacitive load $C_L$. The capacitive load $C_L$ is connected on one side to earth potential.

In addition to the components corresponding to those of the circuit shown in FIG. 2, the arrangement of FIG. 3 also includes an output diode bypass switch $S_2$, which, when closed, bypasses the output diode $D_1$ to allow current flow from the capacitive load $C_L$ to the inductor L.

Between the DC supply and the inductor L is provided an arrangement of components which substantially mirrors the arrangement of the capacitive load $C_L$, output diode $D_1$, output diode bypass switch $S_2$ and output switch $S_1$. Thus, a reservoir switch $S_3$ is provided between the inductor L and earth potential. In parallel with the reservoir switch $S_3$ is a reservoir capacitor $C_R$ which is also connected on one side to earth potential. Between the DC supply and the inductor L is arranged a reservoir diode $D_2$ to prevent current flow from the reservoir capacitor $C_R$ through the inductor L. A reservoir diode bypass switch $S_4$ is provided in parallel with the reservoir diode $D_2$ in order to selectively permit discharge of the reservoir capacitor $C_R$ through the inductor L. A supply switch $S_5$ is provided in series with the DC supply to selectively enable or disable supply of current to the circuit.

The circuit shown in FIGS. 3a to 3c is capable of charging the capacitive load $C_L$ to a voltage which is higher than that of the DC supply and then discharging the capacitive load $C_L$ so that energy therefrom is stored in the reservoir capacitor $C_R$. The capacitive load $C_L$ can then be recharged from the reservoir capacitor $C_R$. In this way, the capacitive load $C_L$ can be charged and discharged without significant wastage of energy.

The circuit shown in FIGS. 3a to 3c operates as follows. As shown in FIG. 3a, the supply switch $S_5$ and the reservoir diode bypass switch $S_4$ are closed to provide a current path from the DC supply through the inductor L. The reservoir switch $S_3$ and the output diode bypass switch $S_2$ are open. It will be seen therefore that the circuit in this condition is substantially electrically equivalent to the circuit shown in FIGS. 2a and 2b. Thus, the output switch $S_1$ is pulsed between an open and closed position in order to charge the capacitive load $C_L$ to a desired voltage in a corresponding manner to that described in relation to FIGS. 2a and 2b.

To discharge the capacitive load $C_L$, the supply switch $S_5$ and the reservoir diode bypass switch $S_4$ are held open. The output switch $S_1$ is held open and the output diode bypass switch $S_2$ is closed so that there is a current path from the capacitive load $C_L$ through the inductor L. The reservoir switch $S_3$ is pulsed in order to charge the reservoir capacitor $C_R$ in the manner described in relation to FIG. 2 while drawing current from the capacitive load $C_L$.

The capacitive load $C_L$ is recharged from the reservoir capacitor $C_R$ as shown in FIG. 3c. In this case, the arrangement of the switches $S_1$ to $S_4$ is identical to that in FIG. 3a when the capacitive load is charged from the DC supply. However, in this case, the supply switch $S_5$ is held open so that current is not drawn from the DC supply.

Thus, it will be appreciated that the circuit shown in FIG. 3 is capable of charging and discharging a capacitive load without discarding energy from the load.

Figure 4:
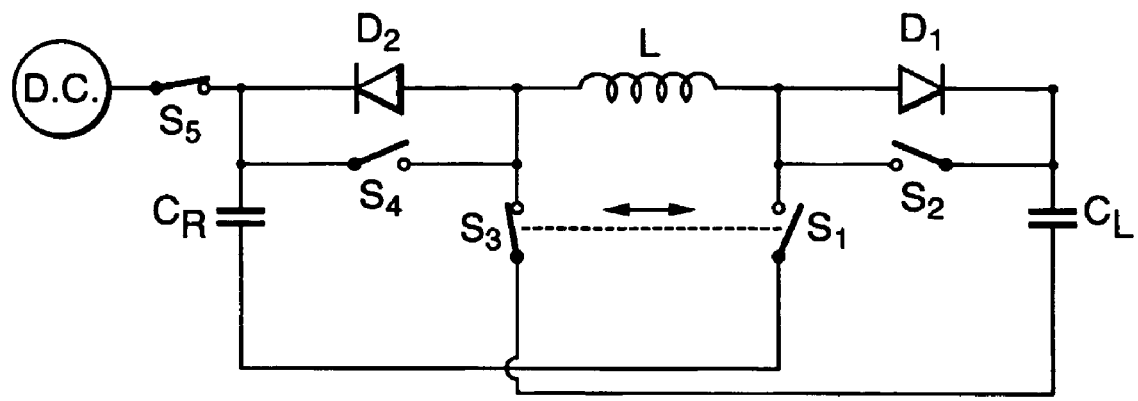
FIG. 4 illustrates the configuration of an alternative form of the embodiment of FIG. 3.

FIG. 4 shows an alternative configuration of the embodiment of FIG. 3 which does not require connection to earth potential. According to this configuration, a connection is made between the capacitive load $C_L$ and the reservoir switch $S_3$ and a connection is made between the reservoir capacitors $C_R$ and the output switch $S_1$. The operation of the circuit is similar to that of the circuit shown in FIGS. 3a to 3c with the exception that in this arrangement the output switch $S_1$ and the reservoir switch $S_3$ are arranged to operate in antiphase, so that when one is open, the other is closed and vice versa.

Figure 5A:
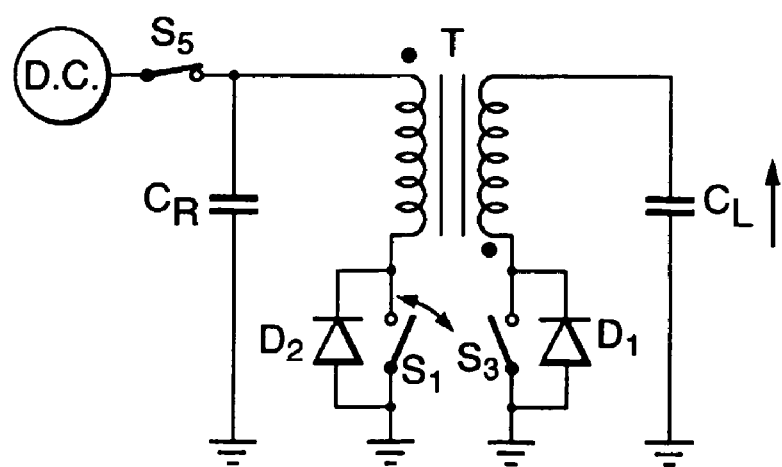
FIGS. 5a to 5c illustrate the operation of a further embodiment of the invention.
Figure 5B:
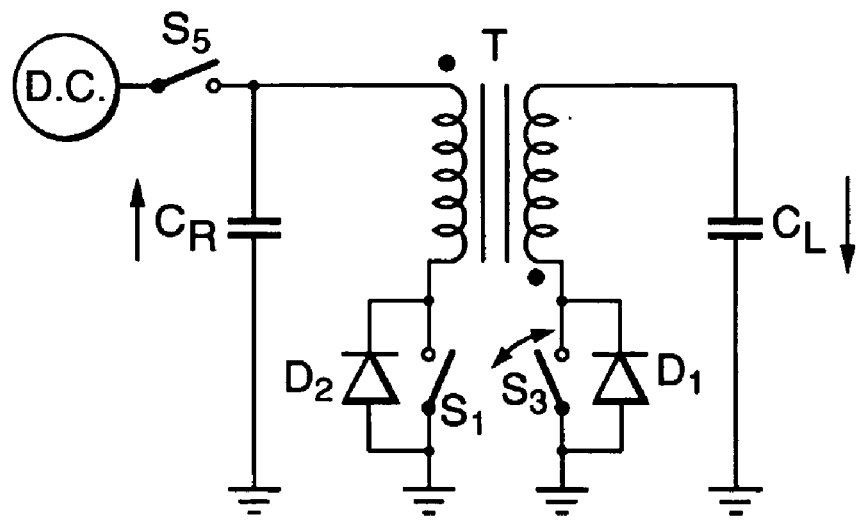
Figure 5C:
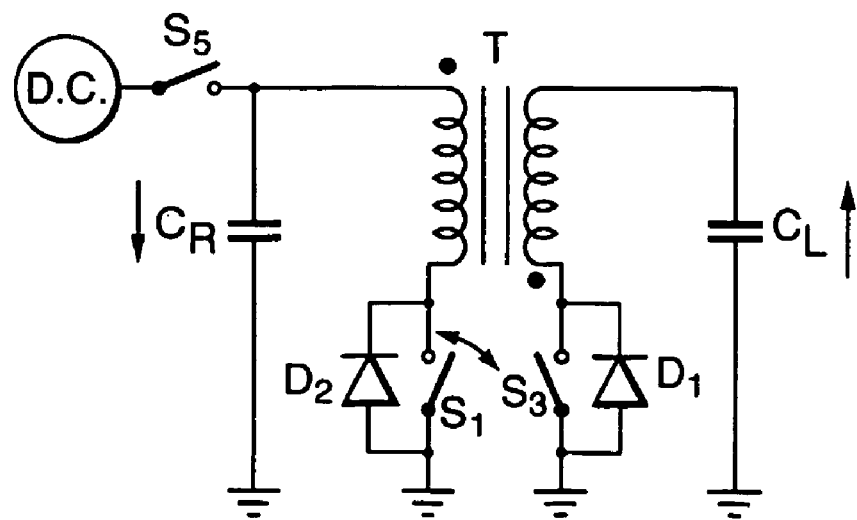

FIGS. 5a to 5c show a further embodiment of the invention in which the inductor L is replaced by a transformer T. This arrangement has the advantage that there is no direct current path between the reservoir capacitor $C_R$ and the capacitive load $C_L$, which reduces the number of switches that are required in the circuit.

The circuit comprises two halves linked inductively by the transformer T. One half of the circuit comprises the reservoir capacitor $C_R$, the primary winding of the transformer T and the output switch $S_1$ in series. The reservoir diode $D_2$ is provided in parallel with the output switch $S_1$. The DC supply, in series with the supply switch $S_5$, is provided in parallel with the reservoir capacitor $C_R$.

The other half of the circuit comprises the capacitive load $C_L$ in series with the secondary winding of the transformer T and the reservoir switch $S_3$. The output diode $D_1$ is provided in parallel with the output switch $S_3$. The primary and secondary windings are arranged such that the current induced in the secondary winding is in the opposite sense to that in the primary winding.

The operation of the circuit shown in FIGS. 5a to 5c is as follows. As shown in FIG. 5a, to charge the capacitive load $C_L$ from the DC supply, the supply switch $S_5$ is closed and the reservoir switch $S_3$ is open. The output switch $S_1$ is pulsed so that energy is transferred from the reservoir side of the transformer to the capacitive load $C_L$ by inductive coupling of the windings of the transformer T. In this way, the capacitive load $C_L$ is charged to a high voltage.

To discharge the capacitive load $C_L$, the supply switch $S_5$ is held open, the output switch $S_1$ is held open and the reservoir switch $S_3$ is pulsed so that energy is transferred from the capacitive load $C_L$ to the reservoir capacitor $C_R$ via inductive coupling in the transformer T. This situation is shown in FIG. 5b.

To transfer energy from the reservoir capacitor $C_R$ to the capacitive load $C_L$ the supply switch $S_5$ is held open, the reservoir switch $S_3$ is held open and the output switch $S_1$ is pulsed so that energy is transferred by inductive coupling in the transformer T from the reservoir capacitor $C_R$ to the capacitive load $C_L$.

It will be seen that the simple arrangement in FIG. 5 allows the capacitive load $C_L$ to be charged to a high voltage and energy from the capacitive load $C_L$ to be transferred back to the reservoir capacitor $C_R$ so that energy wastage is minimised.

Figure 6:
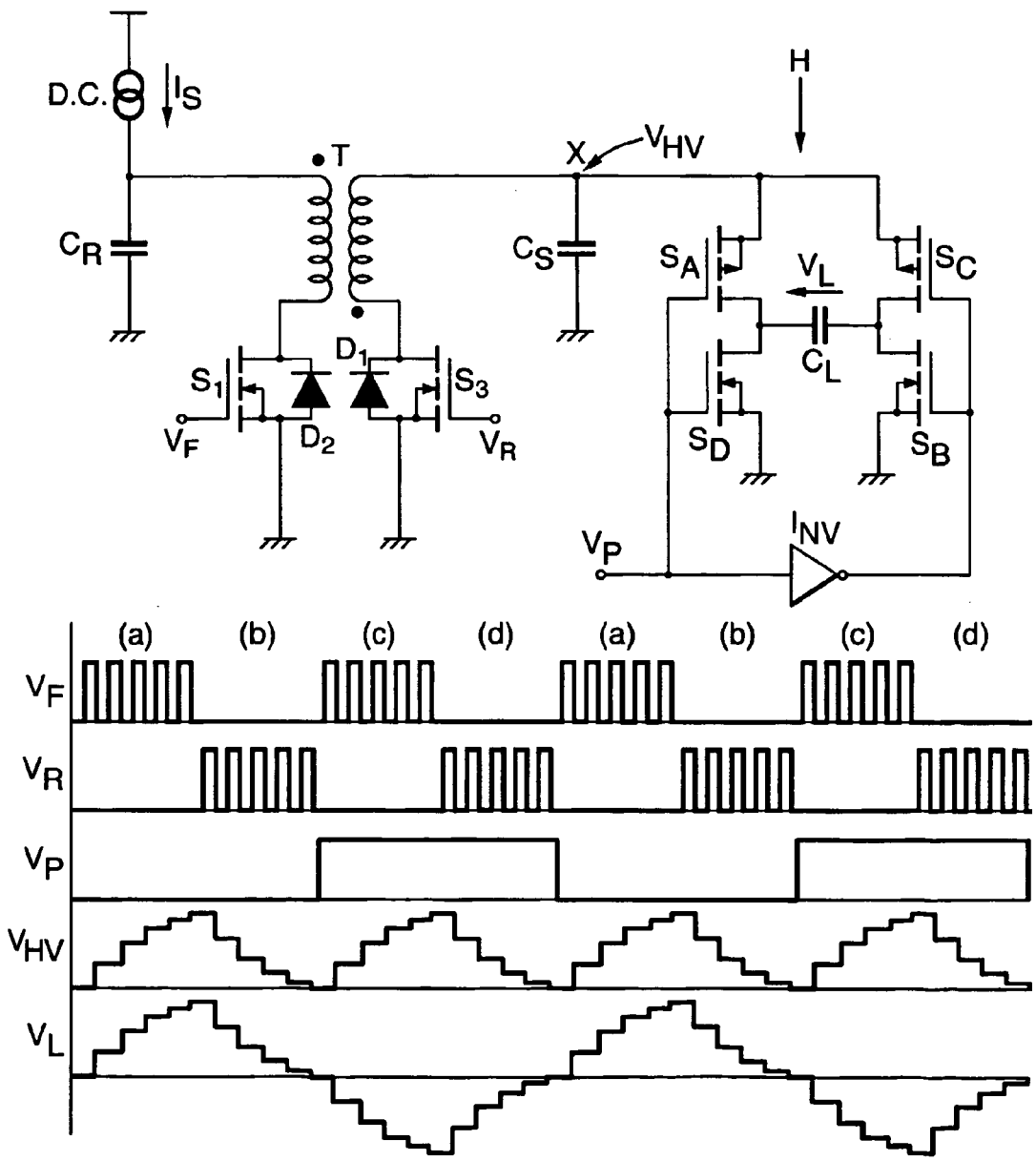
FIG. 6 illustrates the operation of a preferred embodiment of the invention.

FIG. 6 shows a circuit in accordance with a preferred embodiment of the invention. The circuit combines the features of the arrangement of FIG. 5 and the H-bridge of FIG. 1.

The circuit shown in FIG. 6 comprises a reservoir capacitor $C_R$ having a capacitance of approximately 1 µF in series with the primary winding of a transformer T and an n-channel FET. The n-channel FET provides the output switch $S_1$, and also the reservoir diode $D_2$ by means of the parasitic diode inherent in the FET construction. The gate of the n-channel FET $S_1$ is supplied with a forward voltage signal $V_F$.

The DC supply is arranged in parallel with the reservoir capacitor $C_R$ for supplying a current $I_S$.

The circuit shown in FIG. 6 further comprises another n-channel FET in series with the secondary winding of the transformer T and an H-bridge H. The n-channel FET provides the reservoir switch $S_3$ and the output diode $D_1$ by means of the parasitic diode of the FET. The gate of the FET $S_3$ is supplied with a reverse voltage $V_R$.

A smoothing capacitor $C_S$ is provided in parallel with the H-bridge H and has a capacitance of around 1 nF.

The H-bridge H comprises two parallel limbs. The first limb comprises a p-channel FET $S_A$ in series with an n-channel FET $S_D$. Between the two FETs $S_A$ and $S_D$ there is a connection for the capacitive load $C_L$, which is an electroluminescent lamp with a capacitance of around 10 nF. The gates of the FETs $S_A$ and $S_D$ are supplied with a polarity voltage $V_P$. The other limb of the H-bridge comprises a p-channel FET $S_C$ in series with an n-channel FET $S_B$. The capacitive load $C_L$ is connected to a point between the two FETs $S_C$ and $S_B$. The gates of the FETs $S_C$ and $S_B$ are supplied with the inverse of the polarity voltage $V_P$ by means of an inverter INV.

As indicated by the voltage graphs in FIG. 6, one cycle of the circuit comprises four distinct phases a, b, c and d. In phase a, the polarity voltage $V_P$ is low, such that FETs $S_A$ and $S_B$ conduct while FETs $S_C$ and $S_D$ do not conduct. The reverse voltage $V_R$ is low so that the reservoir FET $S_3$ does not conduct. The forward voltage $V_F$ pulses so that the output FET $S_1$ alternately conducts and does not conduct. Consequently, the changing current through the primary winding of the transformer T induces a current in the secondary winding to charge the smoothing capacitor $C_S$ and the capacitive load $C_L$, via the FET $S_A$. The voltage $V_L$ across the capacitive load $C_L$ in the direction of the arrow in FIG. 6 rises due to is the increased charge on the capacitive load $C_L$, as does the voltage $V_{HV}$ at point X.

In phase b, the forward voltage $V_F$ is held low such that the output FET $S_1$ does not conduct. The polarity voltage $V_P$ remains low so that the FETs $S_A$ and $S_B$ continue to conduct, while the FETs $S_C$ and $S_D$ do not. The reverse voltage $V_R$ pulses so that when the reverse voltage $V_R$ is high, current flows from the capacitive load $C_L$ via the FET $S_A$ through the secondary winding of the transformer T and through the reservoir FET $S_3$ to earth. When the forward voltage $V_F$ goes low the reservoir FET $S_3$ ceases to conduct which causes the energy in the secondary winding of transformer T to force a current flow in the primary winding to charge the reservoir capacitor $C_R$. Consequently, the voltage $V_L$ across the capacitive load $C_L$ drops, as does the voltage $V_{HV}$ at point X.

In phase c, the polarity voltage $V_P$ goes high, such that the FETs $S_A$ and $S_B$ cease to conduct and the FETs $S_C$ and $S_D$ begin to conduct. The polarity of the capacitive load $C_L$ relative to the point X is therefore reversed. However, it is to be noted that when this change of polarity occurs, the charge on the capacitive load $C_L$ is small. In this way, it is unnecessary to draw significant current when the polarity of the H-bridge is switched.

During phase c, the reverse voltage $V_R$ is low so that the reservoir FET $S_3$ does not conduct. The forward voltage $V_F$ is pulsed so that current is drawn intermittently from the reservoir capacitor $C_R$ through the primary winding of the transformer T to induce a current in the secondary winding to charge the capacitive load $C_L$. However, because the FETs $S_C$ and $S_D$ are conducting rather than the FETs $S_A$ and $S_B$, the capacitive load $C_L$ is charged with current in the opposite direction to that in phase a, so that a negative voltage relative to the voltage $V_{HV}$ at point X is provided on the capacitive load $C_L$.

In phase d, the capacitive load $C_L$ is discharged and the energy is stored in the reservoir capacitor $C_R$ in the same manner as in phase b.

Between phase d and the repeat of phase a, the polarity voltage $V_P$ goes low. Again, this occurs while the voltage on the capacitive load $C_L$ is small, so that it is unnecessary to draw significant current.

Thus, it will be seen that according to this arrangement there is provided a simple, energy efficient power supply for an electroluminescent lamp.

In summary, a high voltage AC power supply circuit for a capacitive load, such as an electroluminescent lamp, includes an inductive component and an output FET in series. The output FET can be pulsed so that the inductive component generates a voltage to charge the capacitive load via an H-bridge. A diode prevents current discharging from the capacitive load while the output FET is closed. The circuit also includes a reservoir capacitor and a reservoir FET in series with the inductive component. The reservoir FET can be pulsed so that the inductive component generates a voltage to charge the reservoir capacitor by transferring energy from the capacitive load. A diode prevents current discharging from the reservoir capacitor while the reservoir FET is closed. Energy can be transferred from the capacitive load to the reservoir capacitor and back again to reduce the amount of energy that must be discarded during operation of the circuit.

It should be apparent that the foregoing relates only to the preferred embodiments of the present invention and that numerous changes and modification may be made herein without departing from the spirit and scope of the invention as defined by the following claims and the equivalents thereof.

The invention claimed is:

1. An electronic circuit for providing a high voltage alternating current supply from a DC supply to an electroluminescent lamp, wherein:
   the circuit comprises an inductive element and an output switching element arranged in series;
   the output switching element is operable to alternate, in use, between a first state and a second state, whereby in the first state a current path is provided through the inductive element and the output switching element, which current path is interrupted in the second state, such that when the output switching element changes from the first state to the second state, the inductive element generates a voltage at an output of the circuit for charging the electroluminescent lamp;
   the circuit comprises an output diode arranged to prevent current flowing back from the output while the output switching element is in the first state;
   the circuit further comprises a reservoir capacitor, a reservoir switching element in series with the inductive element, and a reservoir diode;
   the reservoir switching element is operable to alternate between a first state and a second state, whereby in the first state a current path is provided from the electroluminescent lamp through the inductive element and the reservoir switching element, which current path is interrupted in the second state, such that when the reservoir switching element changes from the first state to the second state the inductive element generates a voltage to charge the reservoir capacitor; and
   the reservoir diode is arranged to prevent current flowing back from the reservoir capacitor while the reservoir switching element is in the first state, whereby energy can be transferred from the electroluminescent lamp to the reservoir capacitor by means of the inductive element and the reservoir switching element, and energy can be transferred from the reservoir capacitor to the electroluminescent lamp by means of the inductive element and the output switching element;
   the circuit further comprising a supply selector arranged to selectively enable or disable supply of current from the DC supply, and which is arranged to disable supply of current in use when energy is being transferred from the electroluminescent lamp to the reservoir capacitor.

2. An electronic circuit as claimed in claim 1, wherein the reservoir capacitor has a capacitance which is greater than that of the capacitive load.

3. An electronic circuit as claimed in claim 1, wherein the inductive element is a transformer.

4. An electronic circuit as claimed in claim 1, wherein the output diode is arranged in parallel with the reservoir switching element.

5. An electronic circuit as claimed in claim 4, wherein the output diode and the reservoir switching element are in the form of a single field effect transistor.

6. An electronic circuit as claimed in claim 1, wherein the reservoir diode is arranged in parallel with the output switching element.

7. An electronic circuit as claimed in claim 6, wherein the reservoir diode and the output switching element are in the form of a single field effect transistor.

8. An electronic circuit as claimed in claim 1, wherein the output switching element and/or the reservoir switching element is connected directly to earth potential.

9. An electronic circuit as claimed in claim 1, wherein the circuit further comprises an H-bridge connected to the output and having two parallel limbs, each limb having a first switching element in series with a second switching element and a node between the first and second switching elements, the capacitive load being connected, in use, between the respective nodes of the limbs, wherein
   the switching elements of the H-bridge are controlled alternately such that in a first condition the first switching elements of one limb and the second switching elements of the other limb conduct to supply current from the output to the capacitive load in one direction, and in a second condition the other two switching elements of the limbs conduct to supply current from the output to the capacitive load in the opposite direction.

10. An electronic circuit as claimed in claim 9, wherein the H-bridge is arranged to switch between the first condition and the second condition while energy from the capacitive load is stored in the reservoir capacitor.

11. An electronic circuit as claimed in claim 9, wherein the circuit is arranged to operate in accordance with the following steps:
   a) the H-bridge is switched to the first condition;
   b) energy from the reservoir capacitor is transferred to the capacitive load by means of the inductive element and the output switching element;
   c) energy from the capacitive load is transferred to the reservoir capacitor by means of the inductive element and the reservoir switching element;
   d) the H-bridge is switched to the second condition;
   e) energy from the reservoir capacitor is transferred to the capacitive load by means of the inductive element and the output switching element;
   f) energy from the capacitive load is transferred to the reservoir capacitor by means of the inductive element and the reservoir switching element; and
   g) the steps a) to f) are repeated.

12. An electronic circuit as claimed in claim 1, wherein current is supplied to the reservoir and/or the capacitive load from a DC supply to compensate energy losses in the circuit.

13. The circuit of claim 1, in which the supply selector comprises a switch.

14. The circuit of claim 1, in which the supply selector comprises a DC current source.

* * * * *